Patented July 26, 1927.

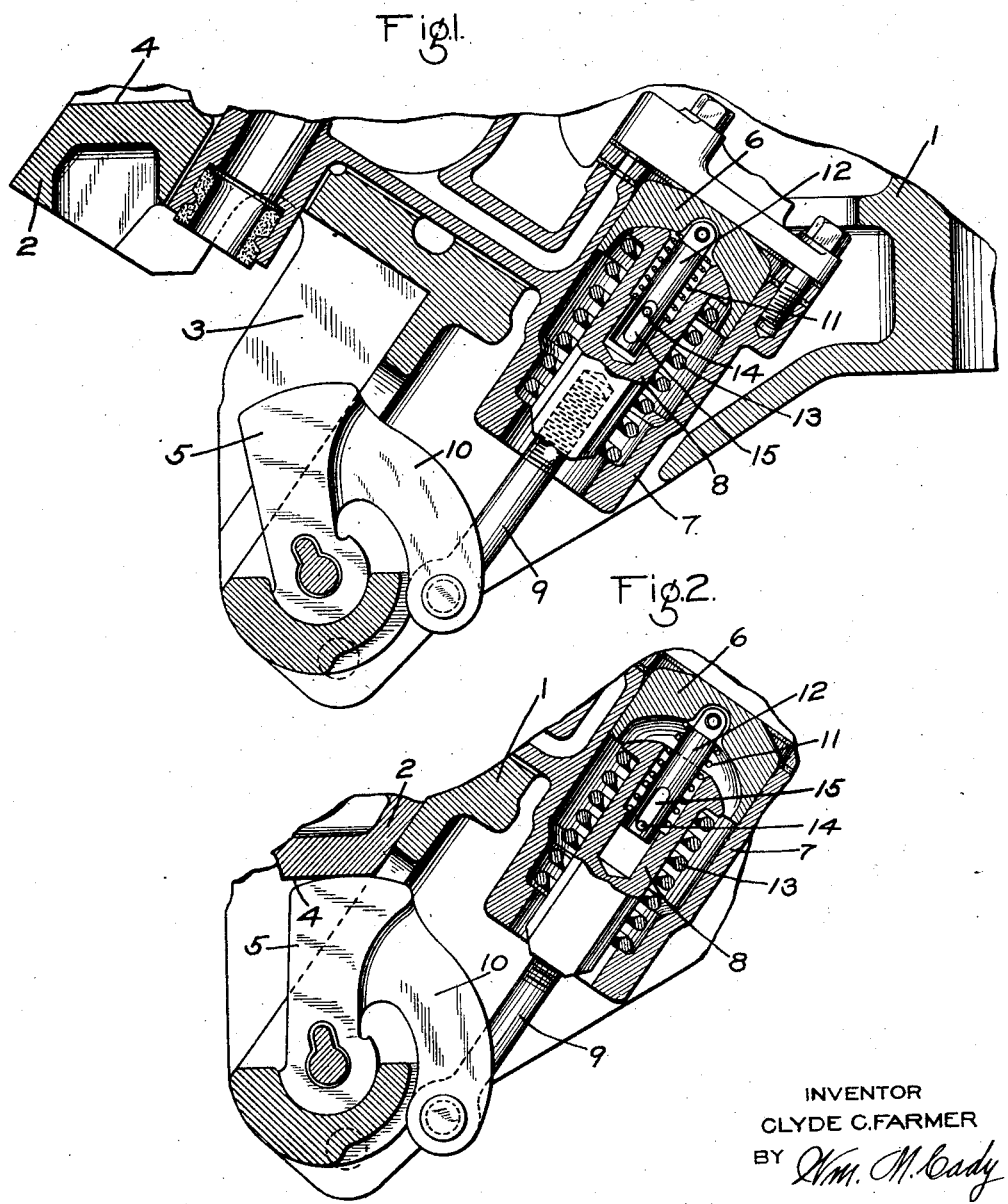

1,636,687

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC CAR COUPLER.

Application filed July 18, 1924. Serial No. 726,736.

This invention relates to car couplers, and more particularly to a car coupler of the tight lock type.

In one form of tight lock coupler, the coupler head is provided with a pivoted latch or lever having a cam face adapted to engage a surface of a counterpart coupler head when couplers are coupled together, so as to tightly lock the couplers in engagement.

The latch is operatively connected to a fluid pressure controlled piston and when fluid under pressure is supplied to the piston, the latch is thereby shifted from its coupler locking position to permit the uncoupling of the coupler heads.

The principal object of my invention is to provide means for facilitating the unlocking movement of the latch by the operating piston.

In the accompanying drawing; Fig. 1 is a sectional view of a portion of a tight lock coupler head, showing my improvement applied thereto; and Fig. 2 a view of the coupler locking mechanism, showing the parts in the coupled position.

The coupler may comprise a coupler head 1 having a nose portion 2 adapted to engage in a recess 3 of a counterpart coupler head in the act of coupling. The nose portion 2 is provided with a surface 4 adapted to be engaged by a cam face of a pivoted lever or latch 5 for the purpose of locking the coupler heads in the coupled position.

According to my invention, the mechanism for operating the latch 5 to effect the release of the couplers may comprise a piston head 6 contained in a piston cylinder 7, said piston head being adapted to operate a stem 8, but having a movement relative to said stem. The stem 8 is connected to a rod 9, which is pivotally connected to an arm 10 carried by the latch 5. A spring 11 is interposed between a shoulder on the stem 8 and the piston head 6 and surrounds a guide stem 12, pivotally connected to the piston head 6. A spring 13 is also interposed between a shoulder at the interior of the cylinder 7 and a shoulder on the stem 8. A pin 14, secured to the stem 8 works in a slot 15 provided in the guide stem 12 and serves to limit the relative movement between the piston head 6 and the stem 8.

In operation, when the coupler heads are in the coupled position, as shown in Fig. 2, the pivoted latch 5 engages the surface 4 of the nose portion 2 of a counterpart coupler head and is held in engagement by the spring 13, acting through the stem 8 and the arm 10. The piston head 6 is maintained in its outer position by spring 11, so that there is a space between the piston head and the stem 8.

When it is desired to uncouple, fluid under pressure is admitted to the piston head 6 and said piston head is then moved and, by reason of the clearance space between the piston and the stem 8, will strike the stem a hammer blow. The stem 8 is then operated to move the latch 5 out of engagement with the surface 4, thus permitting the uncoupling of the coupler heads.

Any tendency of the latch 5 to stick and resist release movement, is effectively overcome by the hammer blow given to the stem 8 when fluid under pressure is supplied to the piston head 6.

Having now described my invention, what I claim as new and desire to secure by Letters Patent, is:—

1. A car coupler comprising a coupler head, a locking latch pivoted to said head for engaging a surface on a counterpart coupler head to lock the coupler heads together, an operating stem operatively connected to said latch, and a piston head having a lost motion connection to said stem and operated by fluid under pressure for operating said stem.

2. A car coupler comprising a coupler head, a locking latch pivoted to said head for engaging a surface on a counterpart coupler head to lock the coupler heads together, an operating stem operatively connected to said latch, and a piston head having a lost motion connection to said stem and movable by fluid under pressure to engage said stem.

3. A car coupler comprising a coupler head, a locking latch for engaging a surface on a counterpart coupler head to lock the coupler heads together, an operating stem operatively connected to said latch and carrying a pin, a member having a lost motion slot through which said pin extends, and a piston head connected to said member and operated by fluid under pressure for operating said member and thereby said pin, stem, and latch.

4. A car coupler comprising a coupler head, a latch for engaging a surface on a counterpart coupler head to lock the coupler heads in the coupled position, a stem operatively connected to said latch, a spring acting on said stem and tending to move said latch to its coupler locking position, a piston head having a lost motion connection to said stem and operated by fluid under pressure to engage said stem, and a spring interposed between said stem and said piston head.

5. A car coupler comprising a coupler head, a latch for engaging a surface on a counterpart coupler head to lock the coupler heads in the coupled position, a stem operatively connected to said latch, a spring acting on said stem and tending to move said latch to its coupler locking position, a piston head having a movement relative to said stem and operated by fluid under pressure to engage said stem, a lost motion member connecting said stem and said piston head, and a spring interposed between said stem and the piston head.

In testimony whereof I have hereunto set my hand.

CLYDE C. FARMER.